Figure 1:
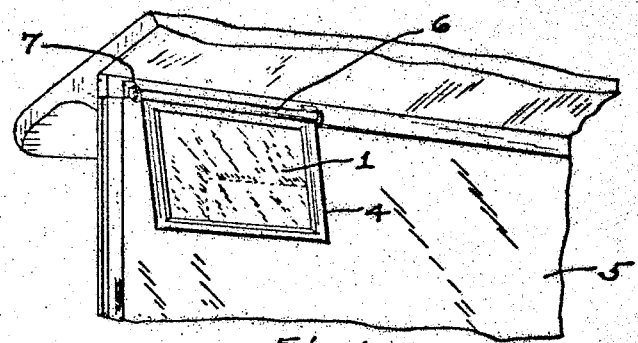

Dec. 23, 1930.  P. J. GROENENSTEIN  1,786,011
GLARE SHIELD
Filed Nov. 29, 1926

Philip J. Groenenstein,
INVENTOR

BY Fay, Oberlin & Fay,
ATTORNEYS

Patented Dec. 23, 1930

1,786,011

UNITED STATES PATENT OFFICE

PHILIP J. GROENENSTEIN, OF CLEVELAND, OHIO

GLARE SHIELD

Application filed November 29, 1926. Serial No. 151,234.

This invention as indicated relates to a glare shield. More particularly it comprises a plural vision screen or transparent medium adapted to shield the eyes of the user. It is especially suited for use adjacent the windshield of an automobile in a position to intercept the rays of headlights on an approaching automobile or the rays of the sun when the same is low on the horizon so that the driver of a motor vehicle may be protected from glare, and at the same time may have a section of greater transparency than another portion of the screen through which a clearer view of the road may be obtained. It also contemplates an improved mounting for the screen which will conceal and protect the adjusting mechanism. Heretofore it has been the practice in glare screens to have the same of but a single tone and difficulty has been experienced in providing a material of sufficient transparency to permit a clear view of the road and at the same time to cut off the bright rays found in some auto headlights or from the direct rays of the sun when the driver is moving toward the same.

The present invention has for its principal object to obviate the difficulty set forth, and provide in a single glare screen a medium which will effectively protect the driver from the direct rays of bright light which may be encountered on the road and which device at the same time will provide an area through which clear vision of the roadway may at all times be obtained. Another object of the invention is to provide a glare screen of flexible non-breakable material yet which will successfully withstand exposure to the weather and at all times be satisfactorily transparent so that adequate vision may be had therethrough, and which will have an area of deeper color across one portion of the same. Another object of the invention is to provide a glare screen of pyralin or some similar material by making the same of a plurality of layers, one layer having greater area than the other and being of lighter tone and being united with a second layer preferably of very slight thickness under conditions of heat and high pressure so as to form a practically homogeneous sheet which will at all times be free from any tendency to split or separate along the lines of juncture. Another object of the invention is to provide a new and effective adjusting means for the screen which will be concealed and protected within the supporting arms. Other and further objects of the invention will appear in the course of the following description.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figures 2, 4:
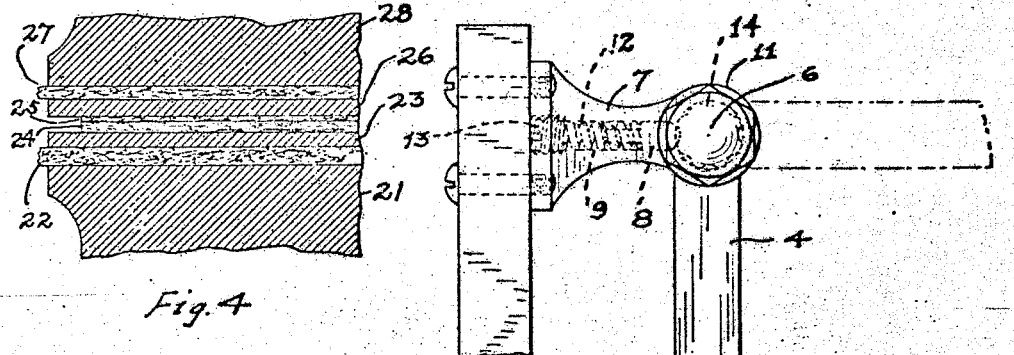
Figure 3:
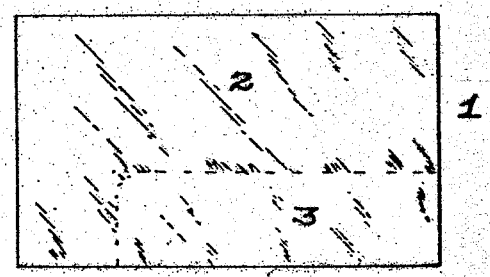

In said annexed drawing:

Fig. 1 is a perspective view showing the glare screen embodying the principle of my invention as applied adjacent the windshield of an automobile; Fig. 2 is an enlarged detail view of the supporting bracket and adjusting means for the glare screen shown in Fig. 1; Fig. 3 is an outline showing a sheet of pyralin made up of a portion of heavy tone and an area of lighter tone so as to provide a two-vision glare screen; and Fig. 4 is a fragmentary sectional view showing the method of making the glare screen shown in Fig. 3.

As is clearly shown in the drawing, the glare screen 1 comprises a sheet of material having two degrees of transparency with the portion of less transparency 2 preferably covering the greater area of the sheet, and a portion of greater transparency 3 being positioned preferably adjacent the lower edge of the same. The positions of the greater and less transparent portions may be varied to suit the particular conditions to be met in the use of the article. As ordinarily installed on an automobile, the glare screen will be mounted in a frame 4 horizontally attached to an automobile adjacent the windshield 5 by means of a pivot bar 6 and supporting brackets 7, so as to position said screen inside of and adjacent said windshield.

In order that the screen may be moved to a position substantially parallel with said windshield in front of the driver or other occupant of the motor vehicle so as to prevent annoyance from bright rays of light from approaching vehicles or from the sun when the same is in a position low on the horizon, an adjusting means for the screen is provided. This adjusting means as is more clearly shown in Fig. 3 comprises a plunger 8 housed within a central tubular bore 9 within one or both of the brackets 7 and forced outwardly in line with the journal 11 by means of an expansion coil spring 12, which bears at its rearward end against a screw threaded plug 13, engaged in the base of the bracket. The pivot bar 6 is rigidly mounted on the upper edge of the frame 4 and has projecting ends 14 fitting within the journals and one, or both, of which is circumferentially notched to engage with the nose of the plunger 8.

It has heretofore been the practice as stated to provide screens of the character indicated having but the single tone. The density of the tone was adjusted to average vision but in some instances such material was not of a suitable character to intercept bright rays of light or if of deep tone would serve to the lower the visibility of the road in addition to protecting the driver from interference with his vision.

The windshield illustrated in the drawing combines a less transparent area and a more greatly transparent area in a single sheet so that a driver may, by proper adjustment of the screen, protect his eyes from the brighter rays of light and at the same time be able to see the edge of the road or obstructions on the roadway through the more transparent area adjacent the base of the screen.

As is indicated in Fig. 4 of the drawing, the glare screen is preferably made by utilizing a hydraulic press or similar compressing mechanism and placing upon the lower member of the press 21 a layer of cushioning material 22, over which a steel plate 23, preferably nickel plated is positioned, over which a layer 24 of transparent material such as pyralin, preferably 20/1000 of an inch in thickness is laid. Over this layer a second layer of similar transparent material, preferably of approximately 7/1000 of an inch in thickness is laid, the second layer 25 having a portion cut away to allow for the desired area of clear vision or more greatly transparent medium. A similar steel plate 26 to that first mentioned preferably nickel plated is then positioned above the material with a suitable cushioning layer 27 above the same and the upper member 28 of the press is then brought downwardly preferably with the application of approximately 150 pounds pressure per square inch.

When compressed, in the manner indicated, preferably under slightly increased temperature, the resulting sheet will be found to be formed of sections firmly united to each other and to all appearances will be of approximately uniform thickness. When a sheet of appropriate proportions of clear and less transparent area has been formed, the same is cut to the desired size and inserted within a frame of suitable character as indicated and is suspended preferably in adjustable position adjacent the windshield as has already been described.

The position of the steering wheel and driver's seat must be taken into account when arranging for the installation of the screen so that the area of greater transparency will be sufficiently high to enable the driver to secure a view of the roadway immediately in front of the car to the greatest practical distance without receiving the direct rays, through such lighter portion, from the head lights of an approaching car. When so adjusted there is no danger of persons or objects on the roadway being collided with, inasmuch as the driver will have substantially as good vision through the lower portion of the screen as through the windshield itself, but with a slight softening of the light rays produced by the suitably colored screen.

Any desired color may be used in connection with the screen but it has been found that green is particularly desirable for this purpose. The lighter portion of the screen may be of a light green or even of a slightly amber tone and the upper portion may be of a decided green or other color which is soothing to the vision.

The glare screen may be obviously made of glass or glass and other material, or of a variety of transparent materials, mechanically assembled or firmly united as integral structures. It has been found, however, that most satisfactory results are obtained from a screen formed of two layers of pyralin. The method of producing the screen comprises as has been indicated, the uniting of a layer of greater transparency of the full size of the proposed screen and a layer of lesser transparency of more limited extent so as to leave a margin of greater transparency preferably at the base of the screen. Under the heavy pressure applied when the layers are united, the surfaces are so firmly forced together that in effect an integral structure is produced. It is not intended, however, to limit the application of the invention to the particular material referred to inasmuch as the advantages of the invention may be utilized in a wide variety of ways and with a large variety of materials.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A glare screen for motor vehicles comprising a composite sheet of pyralin formed of a transparent lightly colored base of the full area of the screen and a superimposed layer of less transparent material of lesser area than said base integrally united with the base portion of said screen.

2. A glare screen for motor vehicles comprising a composite sheet of flexible material formed of a transparent lightly colored base of the full area of the screen and a superimposed layer of less transparent material of lesser area than said base integrally united with the base portion of said screen.

3. A glare screen for motor vehicles, comprising a composite sheet of flexible celluloid formed of a transparent lightly colored base of the full area of the screen, and a superimposed layer of less area than said base, and said layers being in intimate contact with each other, said superimposed layer being of such a degree of transparency that the area which it covers will be more opaque than the area of the remainder of the screen.

4. In a glare screen, the combination of a composite sheet of flexible pyralin formed of a plurality of sheets of transparent tinted material, one of said sheets being of the full area of the screen, and another of said sheets being of lesser area than said first mentioned sheet and integrally united therewith.

5. In a glare screen the combination of a composite sheet of flexible material formed of a plurality of sheets of transparent material, one of said sheets being of the full area of the screen, and another of said sheets being of lesser area than said first-mentioned sheet, and integrally united therewith.

Signed by me this 20th day of November, 1926.

PHILIP J. GROENENSTEIN.